O. S. EWING.
Improvement in Animal Traps.

No. 120,953.     Patented Nov. 14, 1871.

Witnesses:
J. Mathys.
C. A. Pettit.

Inventor:
O. S. Ewing.
per _____ Attorneys.

UNITED STATES PATENT OFFICE.

OSCAR S. EWING, OF ROME, TENNESSEE.

IMPROVEMENT IN ANIMAL-TRAPS.

Specification forming part of Letters Patent No. 120,953, dated November 14, 1871.

*To all whom it may concern:*

Be it known that I, OSCAR S. EWING, of Rome, in the county of Smith and State of Tennessee, have invented a new and Improved Animal-Trap; and I do hereby declare the following to be a full, clear, and exact description of the same, reference being had to the accompanying drawing making a part of this specification, in which—

Figure 1:
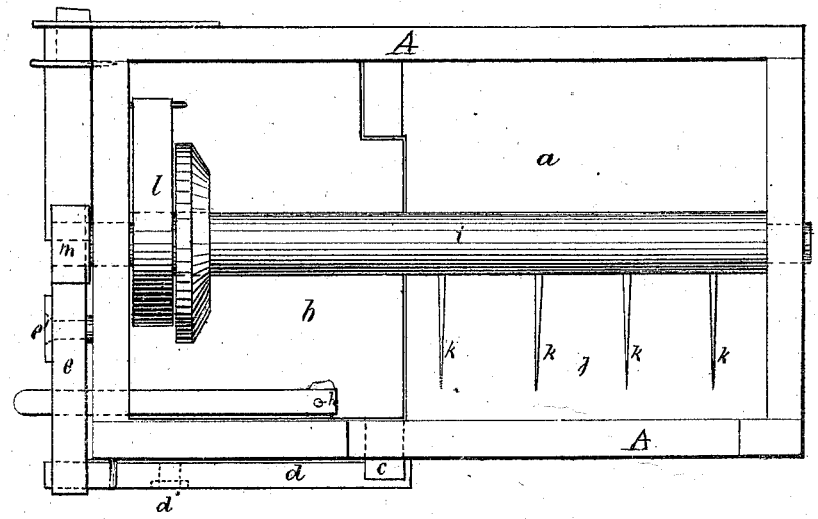
Figure 2:
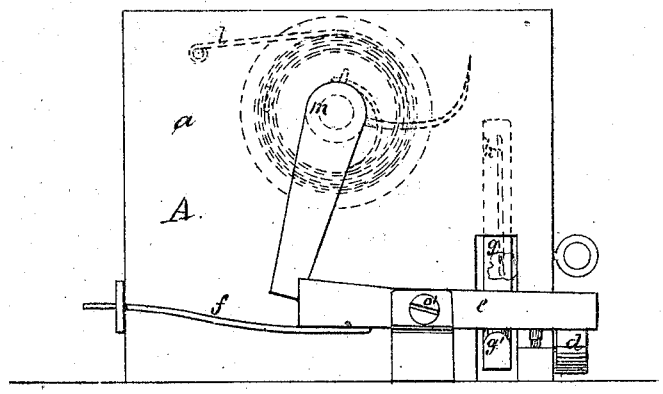

Figure 1 is an end view, and Fig. 2 a top view.

This invention relates to a trap in which the animal entering steps upon a hinged floor that yields beneath it, which yielding, by means of intermediate mechanism, springs the trap; or if the floor does not yield the same result is accomplished by the pulling of the animal on the bait, the trap being provided with teeth which impale the animal, and also cast it out of the trap so as to leave it in readiness for another.

Referring to the drawing, $a$ is the trap; $b$, the yielding part of the bottom, the same being hinged to the back side of the trap, and having a tongue, $c$, which extends through a slot in the front side of the box, and bears on the longer arm of a lever, $d$, which is pivoted to box at $d'$. The shorter arm of said lever supports the longer arm of a lever, $e$, pivoted at $e'$ to the closed end of the box, the other end of the latter being open for the rat or other animal to enter. A spring, $f$, fastened at one end to the outside of the box, bears at its other end against the under side of the lever $e$. Under the longer arm of said lever extends a foot, $g'$, from the trigger $g$, said foot passing through a slot in the end of the box and being pivoted therein. The trigger at its upper end is furnished with a hook, $h$, on which the bait is hung. The foot $g'$ is always in contact with the lever $e$. A shaft, $i$, runs lengthwise of the box in its upper part, that part of the shaft that is over the firm portion $j$ of the floor being armed with crooked teeth $k$. A spring, $l$, is coiled around the shaft $i$ near one end. To the projecting extremity of the shaft a crank, $m$, is attached, by means of which the shaft $i$ is turned so as to wind up the spring $l$. At each revolution of the shaft the crank $m$ strikes and depresses the shorter arm of the lever $e$, which lever becomes a stop to prevent the turning of the shaft in the wrong way. The spring being wound, and bait attached to the hook $h$, a rat approaching the latter through the open end of the trap must first step on the hinged floor $b$, which yields immediately the animal's weight comes upon it, and by so doing depresses the longer arm of the lever $d$ by means of the tongue $c$, thus lowering the shorter arm of the lever $e$, thereby releasing the crank $m$ and leaving the shaft $i$ free to revolve, whose teeth, $k$, thereupon whirl down upon the animal, impale it, and the next instant cast it out through the opposite open side of the box. The floor $b$ being relieved of the animal's weight is raised through the medium of the spring $f$ and levers $d\ e$, the former of which catches the crank $m$ as it flies back and thus resets the trap. Should the floor $b$ for any cause refuse to yield as soon as the animal pulls on the bait, the foot $g'$ raises the longer arm of the lever $e$ and the same result follows.

Having thus described my invention, what I claim as new, and desire to secure by Letters Patent, is—

1. The combination of the box A, yielding-floor $b$, tongue $c$, levers $d\ e$, springs $f\ l$, crank $m$, shaft $i$, and teeth $k$, as specified.

2. In combination with the elements of above claim, the trigger $g$ and arm $g'$, as described.

OSCAR S. EWING.

Witnesses:
 JAMES M. GRAY,
 I. J. WILKERSON.

(143)